(12) United States Patent
Shepherd

(10) Patent No.: US 9,036,010 B2
(45) Date of Patent: May 19, 2015

(54) TRANSPORT OF STEREOSCOPIC IMAGE DATA OVER A DISPLAY INTERFACE

(75) Inventor: Nicoll Burleigh Shepherd, Coulsdon (GB)

(73) Assignee: Koninklijke Philips N.V., Eindhoven (NL)

( * ) Notice: Subject to any disclaimer, the term of this patent is extended or adjusted under 35 U.S.C. 154(b) by 425 days.

(21) Appl. No.: 12/808,685

(22) PCT Filed: Dec. 15, 2008

(86) PCT No.: PCT/IB2008/055305
§ 371 (c)(1),
(2), (4) Date: Jun. 17, 2010

(87) PCT Pub. No.: WO2009/077969
PCT Pub. Date: Jun. 25, 2009

(65) Prior Publication Data
US 2010/0315489 A1    Dec. 16, 2010

(30) Foreign Application Priority Data
Dec. 18, 2007    (EP) .................................... 07123461

(51) Int. Cl.
H04N 13/02    (2006.01)
H04N 13/00    (2006.01)

(52) U.S. Cl.
CPC ....... H04N 13/0048 (2013.01); H04N 13/0059 (2013.01); H04N 2213/003 (2013.01)

(58) Field of Classification Search
USPC .......................................................... 348/46
See application file for complete search history.

(56) References Cited

U.S. PATENT DOCUMENTS

| 6,914,637 B1* | 7/2005 | Wolf et al. ..................... 348/473 |
| 2002/0009137 A1 | 1/2002 | Nelson et al. |
| 2005/0146521 A1* | 7/2005 | Kaye et al. ..................... 345/419 |
| 2006/0044388 A1* | 3/2006 | Kim et al. ........................ 348/42 |
| 2006/0192776 A1* | 8/2006 | Nomura et al. ................ 345/419 |
| 2006/0279750 A1* | 12/2006 | Ha ................................. 358/1.2 |
| 2007/0139769 A1 | 6/2007 | DeCusatis et al. |
| 2007/0296859 A1 | 12/2007 | Suzuki |

FOREIGN PATENT DOCUMENTS

| JP | 2003111101 A | 4/2003 |
| JP | 2006295289 A | 10/2006 |
| JP | 2007325101 A | 12/2007 |

(Continued)

*Primary Examiner* — Dave Czekaj
*Assistant Examiner* — Nam Pham

(57) ABSTRACT

A digital display interface (40) connects a first audio-visual device (10) to a second audio-visual device (20). Stereoscopic image data is transmitter over the display interface (40). Components of stereoscopic image data are multiplexed and inserted into an image data carrying element. An existing deep color mode can be re-used for this purpose. Signaling information to help identify or decode the stereoscopic image data is carried in auxiliary data carrying elements. Stereoscopic image data can be distributed between image data carrying data elements and auxiliary data carrying data elements. Auxiliary data carrying elements can be transmitted in horizontal or vertical blanking periods, and can comprise HDMI Data Island Packets. Stereoscopic image data can be sent over an auxiliary data channel. The auxiliary data channel can form part of the same cable as is used to carry a primary channel of the display interface, a separate cable, or a wireless link.

18 Claims, 3 Drawing Sheets

(56) References Cited

FOREIGN PATENT DOCUMENTS

| | | |
|---|---|---|
| JP | 2008117289 A | 5/2008 |
| WO | 2006137006 A2 | 12/2006 |
| WO | 2007069195 A2 | 6/2007 |

* cited by examiner

TRANSPORT OF STEREOSCOPIC IMAGE DATA OVER A DISPLAY INTERFACE

FIELD OF THE INVENTION

This invention relates to transport of image data for the display of stereoscopic images.

BACKGROUND TO THE INVENTION

Various schemes for displaying three dimensional images (static, or moving images) are known. One well-known scheme simultaneously displays two images which are encoded for the left eye and right eye by means of different optical polarizations, or colors (e.g. red and green). A viewer wears a pair of special glasses which have lenses in front of the left and right eyes. The lenses are arranged to pass only the image intended for that eye, i.e. a left eye sees only the image intended for that eye. Another stereoscopic display technique sequentially presents an image intended for the left eye, and an image intended for the right eye. A user wears a special pair of glasses which are shuttered in synchronism with the displayed images, such that the left eye shutter is open during the period when the left eye image is displayed, and the right eye shutter is open during the period when the right eye image is displayed.

Auto stereoscopic display techniques remove the need for a viewer to wear special glasses. One known scheme uses a flat panel display with multisided slanted ventricular lenses mounted in front of display elements. An example of this kind of display is described in WO07/069,195 A2.

Historically, 3D displays have been limited to specialized applications (e.g. medical imaging) or feature film presentation where it is possible to provide bespoke, high cost, display apparatus. There is now considerable interest in delivering stereoscopic content to a much wider audience, including the consumer electronics market. However, an issue with delivering stereoscopic images in a consumer electronics environment is that conventional displays, and display interfaces which connect displays or projectors to media players, have been designed specifically for the display of conventional 2D images.

Schemes for conveying stereoscopic image data within the confines of existing display interfaces have tended to sacrifice part of the active portion of an image to carry additional data necessary to render a stereoscopic image. The WOWvx format developed by Koninklijke Philips Electronics N.V. divides the overall display frame into a number of separate regions where different data can be carried. The overall frame is divided into two sub-frames, arranged side-by-side: a first of the sub-frames carries 2D image data and a second of the sub-frames carries depth information. A header is added to the beginning of the upper left-hand corner of the frame. The image data is carried in a normal manner across a display interface. A display extracts depth data from the second sub-frame and creates a 3D image having a resolution of the first sub-frame. This 3D image can then be 'stretched' to occupy the full visible area of the display.

Digital displays and media players are increasingly being equipped with digital display interfaces such as the High Definition Multimedia Interface (HDMI). The present invention seeks to provide an alternative way of delivering stereoscopic image data over a digital display interface.

SUMMARY OF THE INVENTION

A first aspect of the present invention provides a digital display interface part for use in a first audio-visual device for supporting a digital display interface between the first audio-visual device and a second audio-visual device, the interface part comprising:
an input for receiving image data;
a formatter arranged to format the data for transport over the interface, wherein the formatter is operable in:
a first mode in which the formatter generates a stream of first data elements which carry pixel data of a 2D image;
a second mode in which the formatter generates a stream of second data elements which carry a multiplexed combination of components of a stereoscopic image.

An advantage of this arrangement is that the stereoscopic image data can be carried across a digital display interface using the existing capacity of the interface. Advantageously, where the display interface supports various color depths of image data, such as 48-bit color as well as conventional 24-bit color, the higher capacity transport modes which are intended to transport higher color depth data can be re-used to carry the multiplexed stereoscopic image data. Therefore, no additional capacity is required from the interface to carry the stereoscopic data, while still allowing good color depth for the stereoscopic content. It also has the benefit that little or no changes are required to an existing standard defining the display interface. It also allows stereoscopic image content to be sent with a resolution which is significantly higher than schemes which sacrifice part of the active image area to carry the stereo image data.

Advantageously, the second data elements have a capacity which is no greater than, and preferably the same as, the first data elements. This allows the stereoscopic data to be carried with minimal modification to the standards defining the interface.

The term "stereoscopic image data components" is intended to include any scheme which sends data to construct a stereoscopic (or autostereoscopic) display to a user, and includes: schemes which send left eye image data and right eye image data; schemes which send 2D image data and image depth data; schemes which send 2D image data and image depth data and occlusion information, indicating which objects in the picture are occluded by other objects.

In the case of a stereoscopic image which uses left eye and right eye image data, the formatter can use a portion of the second data element to carry the left eye image data and another portion of the second data element to carry the right eye image data.

In the case of a stereoscopic image which uses 2D+depth data, the formatter can use a portion of the second data element to carry the 2D image data and another portion of the second data element to carry the image depth data. The depth data may additionally be carried in other parts of a signal, such as periods within horizontal or vertical blanking periods. In HDMI, Data Island Packets are carried within these periods, and certain Data Island Packets can be identified as carrying depth data.

Advantageously, signaling information is sent across the interface identifying which mode the formatter is using and further signaling information can allow the second audio-visual device (e.g. a display or projector) to indicate whether it has the capability to render stereoscopic data sent in that formatting mode.

In a High Definition Multimedia Interface (HDMI), signaling can be carried by packets carried within the Data Islands between image data. The capability of a sink device to handle stereoscopic data can be signaled between interface parts using the HDMI Display Data Channel (DDC) channel, with capability data being stored in an Extended Display Identification Data (EDID) ROM at a sink.

A related aspect of the present invention provides a digital display interface part for use in an audio-visual device for supporting a digital display interface between the audio-visual device and another audio-visual device, the interface part comprising:

an input for receiving formatted image data from the interface;

a processor arranged to extract image data, the processor being operable in:

a first mode in which the processor extracts pixel image data for a 2D image from a stream of first data elements; and, a second mode in which the processor demultiplexes components of a stereoscopic image from a stream of second data elements which carry a multiplexed combination of components of a stereoscopic image.

A related aspect of the present invention provides a method of formatting image data at a digital display interface part of a first audio-visual device for transport over a digital display interface between the first audio-visual device and a second audio-visual device, the method comprising:

receiving image data;

formatting the image data for transport over the interface by:

in a first mode, generating a stream of first data elements which carry pixel data of a 2D image; and, in a second mode, generating a stream of second data elements which carry a multiplexed combination of components of a stereoscopic image.

A related aspect of the present invention provides a method of processing image data at a digital display interface part of an audio-visual device, the method comprising:

receiving formatted image data from the interface;

extracting image data by:

in a first mode, extracting pixel image data for a 2D image from a stream of first data elements; and, in a second mode, demultiplexing components of a stereoscopic image from a stream of second data elements which carry a multiplexed combination of components of a stereoscopic image.

A further aspect of the invention provides a digital display interface part for use in a first audio-visual device for supporting a digital display interface between the first audio-visual device and a second audio-visual device, the interface part comprising:

an input for receiving stereoscopic image data;

a formatter arranged to format the data for transport over the interface, wherein the formatter is operable to send a portion of the stereoscopic image data over a primary image data transport channel of the interface and another portion of the stereoscopic image data over an auxiliary data channel.

The interface part can send signaling information across the interface identifying how stereoscopic data is distributed between the primary data channel and the auxiliary data channel.

Advantageously, the stereoscopic image data comprises 2D image data and image depth data and the formatter is arranged to send depth data across the auxiliary data channel.

The auxiliary data channel can comprise a separate line, or lines, within the same cable as the primary channel; a second cable which is separate from a first cable carrying the primary channel; or a wireless link.

A related aspect of the present invention provides a digital display interface part for use in an audio-visual device for supporting a digital display interface between the audio-visual device and another audio-visual device, the interface part comprising:

an input for connecting to a primary image data transport channel of the interface and an auxiliary data channel;

a processor arranged to extract a portion of the stereoscopic image data from the primary image data transport channel of the interface and another portion of the stereoscopic image data from the auxiliary data channel.

A related aspect of the present invention provides a method of sending stereoscopic image data over a digital display interface between a first audio-visual device and a second audio-visual device, comprising, at the first audio-visual device:

receiving stereoscopic image data for transport over the interface;

sending a portion of the stereoscopic image data over a primary image data transport channel of the interface and another portion of the stereoscopic image data over an auxiliary data channel.

A related aspect of the present invention provides a method of processing stereoscopic image data at an audio-visual device for supporting a digital display interface between the audio-visual device and another audio-visual device, the method comprising:

extracting a portion of the stereoscopic image data from a primary image data transport channel of the interface and another portion of the stereoscopic image data from an auxiliary data channel.

A further aspect of the invention provides a digital display interface part for use in a first audio-visual device for supporting a digital display interface between the first audio-visual device and a second audio-visual device, the interface part comprising:

an input for receiving stereoscopic image data;

a formatter arranged to generate a stream of image data carrying data elements and auxiliary data carrying data elements at intervals in the stream, and wherein signaling information for use in decoding the stereoscopic image data is carried in at least one of the auxiliary data elements.

Where the stereoscopic image data comprises left eye image data and right eye image data, the signaling information can specify what data elements carry the left eye image data and what data elements carry the right eye image data. Where the left eye images and right eye images are interleaved on a line-by-line basis, the signaling information can be sent as often as once for each pair of interleaved lines, although it can be sent much less frequently, such as once per field or frame.

Where the stereoscopic image data comprises 2D image data and depth information, the signaling information can specify at least one of: the transmission location, quantity of the depth information.

Advantageously, where the stereoscopic image data has a plurality of different possible formats, the signaling information specifies the format. One of the formats for the stereoscopic image data can be a scheme which encodes the stereoscopic image data within a conventional 2D image format.

Advantageously, the signaling information is carried in a horizontal or vertical blanking period and for a High Definition Multimedia Interface (HDMI) the signaling information can be sent in a Data Island Packet.

A related aspect of the present invention provides a digital display interface part for use in an audio-visual device for supporting a digital display interface between the audiovisual device and another audio-visual device, the interface part comprising:

an input for receiving, from the interface, a stream of image data carrying data elements and auxiliary data carrying data elements at intervals in the stream;

using signaling information carried in at least one of the auxiliary data elements to decode the stereoscopic image data.

A related aspect of the present invention provides a method of sending stereoscopic image data over a digital display interface between a first audio-visual device and a second audio-visual device comprising, at the first audio-visual device:

receiving stereoscopic image data;

generating a stream of image data carrying data elements and auxiliary data carrying data elements at intervals in the stream, and wherein signaling information for use in decoding the stereoscopic image data is carried in at least one of the auxiliary data elements.

A related aspect of the present invention provides a method of processing stereoscopic image data at a digital display interface part of an audio-visual device, the method comprising:

receiving, from the interface, a stream of image data carrying data elements and auxiliary data carrying data elements at intervals in the stream;

using signaling information carried in at least one of the auxiliary data elements to decode the stereoscopic image data.

A further aspect of the invention provides a digital display interface part for use in a first audio-visual device for supporting a digital display interface between the first audio-visual device and a second audio-visual device, the interface part comprising:

an input for receiving stereoscopic image data components;

a formatter arranged to generate a stream of image data carrying data elements and auxiliary data carrying data elements at intervals in the stream, and wherein the stereoscopic image data is distributed between the image data carrying data elements and the auxiliary data carrying data elements.

Advantageously, the stereoscopic image data components are 2D image data and image depth data and wherein the depth data is carried in the auxiliary data carrying data elements. Advantageously, the stream further comprises signaling information, carried within auxiliary data carrying data elements, specifying which part of an image the depth information relates to.

The auxiliary data carrying data elements are sent in a horizontal or vertical blanking period, such as HDMI Data Island Packets.

A related aspect of the present invention provides a digital display interface part for use in an audio-visual device for supporting a digital display interface between the audio-visual device and another audio-visual device, the interface part comprising:

an input for receiving, from the interface, a stream of image data carrying data elements and auxiliary data carrying data elements;

a processor arranged to extract stereoscopic image data from the image data carrying data elements and at least part of the stereoscopic image data from the auxiliary data carrying data elements.

A related aspect of the present invention provides a method of sending stereoscopic data across a digital display interface between a first audio-visual device and a second audio-visual device, the method comprising, at the first audio-visual device:

receiving stereoscopic image data components;

generating a stream of image data carrying data elements and auxiliary data carrying data elements at intervals in the stream, and distributing the stereoscopic image data between the image data carrying data elements and the auxiliary data carrying data elements.

A related aspect of the present invention provides a method of processing stereoscopic image data at a digital display interface part of an audio-visual device, the method comprising:

receiving, from the interface, a stream of image data carrying data elements and auxiliary data carrying data elements;

extracting stereoscopic image data from the image data carrying data elements and at least part of the stereoscopic image data from the auxiliary data carrying data elements.

The functionality described here can be implemented in software, hardware or a combination of these. The invention can be implemented by means of hardware comprising several distinct elements, and by means of a suitably programmed computer. Accordingly, further aspects of the invention provide software for implementing any of the methods. The software may be stored on an electronic memory device, hard disk, optical disk or other machine-readable storage medium. The software may be delivered as a computer program product on a machine-readable carrier or it may be downloaded to the AV device via a network connection.

The invention also extends to signals, for transmission over the display interface, which result from any of the methods.

Features of the various aspects of the invention can be combined.

BRIEF DESCRIPTION OF THE DRAWINGS

Embodiments of the invention will be described, by way of example only, with reference to the accompanying drawings in which.

DESCRIPTION OF PREFERRED EMBODIMENTS

Figure 1:
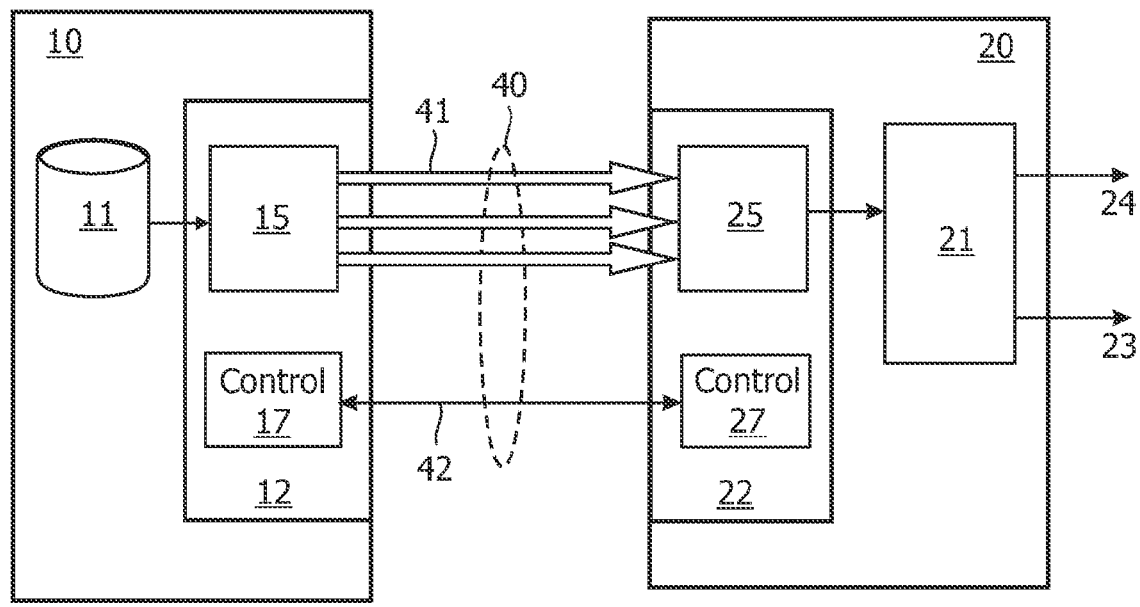
FIG. 1 shows a display interface for carrying image data between two AV devise.

FIG. 1 shows an example scenario in which the invention can be used. In FIG. 1, an AV device 10 which is capable of providing a source of digital AV content is connected to a display (or video projector) 20 via a digital display interface (DDI) 40. Interface parts 12, 22 in devices 10, 20 support the interface 40, and provide functions such as formatting signals into the form required by standards defining the interface 40. The source device 10 can be a device which can retrieve digital AV content from a store 11, such as a hard disk, a solid state memory or an optical disc or any other fixed or removable storage medium or device. Examples of device 10 include a personal video recorder (PVR), an optical disc player such as a DVD player, an HD-DVD player or a Blu-ray player. Alternatively, device 10 can take the form of a set-top box which receives content from a distribution channel (such as a broadcast channel or broadband network or other type of network (e.g. home network)).

There are a variety of methods for displaying stereoscopic (3D) images. The two main methods for transferring 3D image data across an interface are: to transmit two complete, separate, stereoscopic images representing the left and right views as seen by human eyes; and a normal 2D image with associated depth information that can be used to generate the stereoscopic images within the display. The first method generally requires a significantly higher bandwidth (up to twice that needed for a 2D image) over the interface, but needs little processing in the display, while the second method can require a smaller increase in bandwidth, but at the expense of some fast real-time processing in the display to process the depth information.

Current digital display interfaces, such as HDMI, offer a very high bandwidth. These interfaces transfer uncompressed pixel information, unlike other transport mechanisms (such as Ethernet, USB, IEEE1394) which have to transfer compressed images because of their bandwidth limitations. Originally, images transferred by HDMI were limited to 8 bits per color per pixel, so-called "24-bit color". Improvements to HDMI from version 1.3 have allowed HDMI to carry more bits per pixel, with the options of carrying 10, 12 and 16 bits per color per pixel, i.e. up to 48-bit color. HDMI describes Deep Color Pixel Packing modes (HDMI 1.3a, section 6.5.3) which allow the higher color depths just described.

Figure 2:
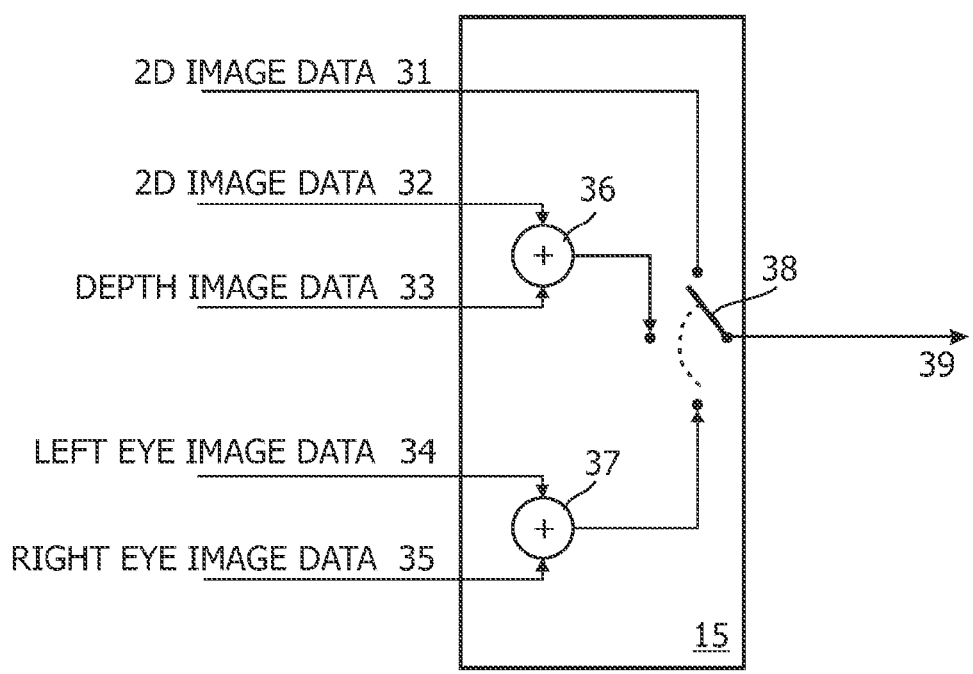
FIG. 2 shows a formatting function at one end of the interface.

According to one embodiment of the present invention, the deep color modes are used to transport stereoscopic image data. The stereoscopic image data can be left image data+right image data or 2D+depth information. FIG. 2 shows a formatting function 15 used within an interface part 12. The formatter 15 can selectively operate in one of a number of different modes. This is shown schematically by formatter selecting one of the sets of inputs: 2D image data 31; 2D+depth image data 32, 33; or left eye and right eye image data 34, 35 for processing and selectively connecting 38 to an interface output 39. Formatter 15 can receive conventional 2D image data 31, such as 24-bit color image data 31. Typically this is received in an RGB or component video (Y,Cr,Cb) format. When receiving stereoscopic image data, formatter 15 multiplexes 36, 37 the image data components. For left eye/right eye image data, the left eye data and right eye data will typically be taken from the same pixel in the left eye/right eye frames or fields of the images, although other algorithms for combining pixels are also within the scope of the present invention. For 2D image+depth information, the 2D image data will typically correspond to a single pixel (e.g. RGB or component video format) and the depth information can take a different form, and may correspond to a different region of the image to the pixel of the 2D image. The formatter 15 may only support one of the 3D formats (i.e. just L+R, or just 2D+depth) or both types of 3D format.

Figure 3:
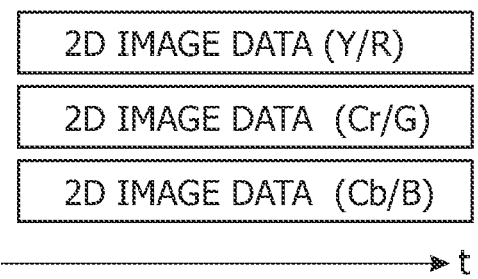
FIG. 3 shows a conventional way of sending 2D image data across a display interface.
Figure 4:
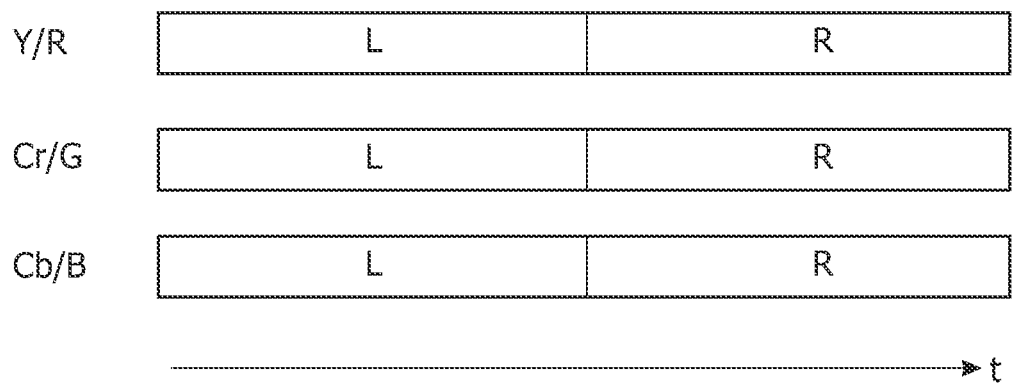
FIGS. 4 and 5 show ways of sending stereoscopic image data across a display interface.
Figure 5:
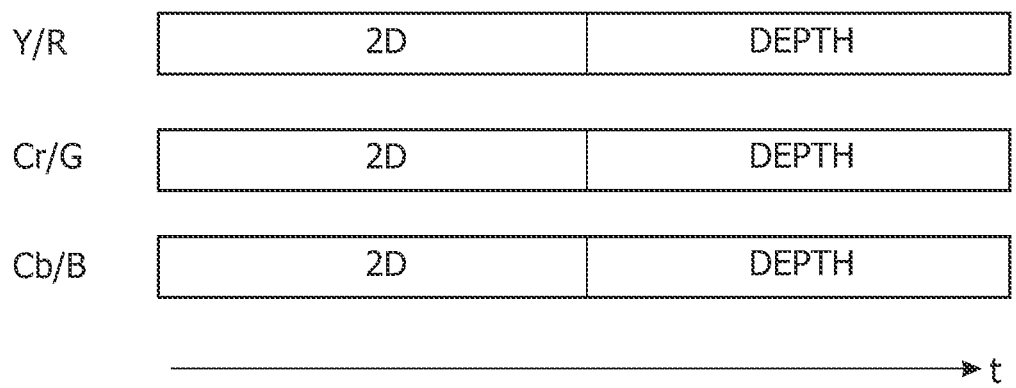

FIGS. 3 to 5 show a range of different ways in which the image data can be multiplexed. FIG. 3 shows conventional image data. In HDMI, the three color components (R,G,B or Y,Cr,Cb) are sent simultaneously on three Transition Minimised Differential Signaling (TMDS) channels 41. TMDS refers to line-level coding applied to the data to maintain an approximate DC balance as well as a reduction in the number of transitions in the data stream. Each color component can be sent using a standard color depth (e.g. 8 bits per color per pixel) or an enhanced color depth, such as 16 bits per color per pixel. FIG. 4 shows a way in which stereoscopic left eye/right eye data can be multiplexed. The components of the left eye data (R,G,B or Y,Cr,Cb) are sent in a first portion of each data-carrying element, and then immediately followed by the components of the right eye data (R,G,B or Y,Cr,Cb). Both left eye and right eye are either sent within the same packet, consecutive image data packets, or parts of consecutive image data packets. As an example, where a 16-bit per color per pixel mode is used, bits 0-7 can carry the left image Y data and bits 8-15 carry the right image Y data. HDMI 1.3a currently allows a color depth of up to 16-bits per color per pixel (48-bit color). FIG. 4 shows how two 24-bit color images can be carried within the existing 48-bit color mode with no additional capacity required from the interface. It will be appreciated that future revisions of HDMI (and other) specifications may extend the bandwidth to permit a larger color depth, which will allow each of the left eye and right eye images to use more bits per pixel, so allowing richer 3D images.

Figure 6:
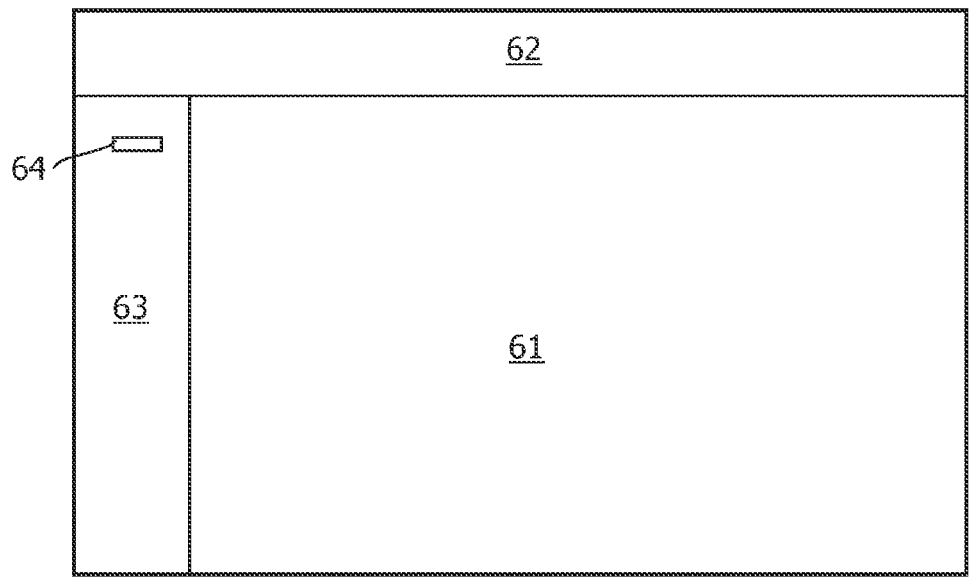
FIG. 6 shows format of an HDMI video frame.

FIG. 5 shows a scheme for sending 2D image data+depth information where the 2D data is sent first, followed by the depth data. Each color component (R,G,B or Y,Cr,Cb) follows the same format. In FIG. 6 the capacity of the packet is divided equally between the 2D data and depth information, although any other division is possible. It may be possible to send significantly less depth data than 2D data, which can allow the 2D image to use a wide color palette and/or high resolution. It is also possible to send some—or all—of the depth information in a different part of the transmitted data stream, such as within specific HDMI Data Island Packets carried within the horizontal and vertical line blanking intervals. This is particularly useful for depth data that is not attached directly to a specific pixel, for instance, it applies to a region of the image.

Interface part 12 sends signaling 42 which indicates the format of the image data, e.g. indicating whether the image data is 2D, stereo (L+R) or stereo (2D+depth). The signaling can also indicate further details of the multiplexing scheme, such as which color depth mode is being used to carry the multiplexed data, the number of bits per data element that are allocated to 2D data and the number of bits per data element that are allocated to depth data. This signaling allows flexibility in how the stereo data is allocated to data carrying elements sent across the interface 40 and allows for the amount of Depth information to be changed dynamically, according to the requirements of the content which is to be displayed. In HDMI, Data Island Packets are sent in horizontal and vertical line blanking periods. The signaling information can conveniently be carried within a Data Island Packet. FIG. 6 shows the layout of an HDMI video frame, showing a region 61 where pixel data is sent across TMDS channels, a horizontal blanking period 63 and a vertical blanking period. Data Island Packets 64 are sent within Data Island periods positioned within the horizontal and vertical blanking periods 62, 63. The signaling data can be carried in a General Control Packet, an Auxiliary Video InfoFrame (AVI) packet or an InfoFrame Packet specifically designated for this purpose. If depth data is carried both within the pixel data carrying data elements and other places of the stream, the signaling can indicate where the depth data is to be found. The amount of depth data and the location(s) of the depth data can vary on a dynamic basis during an image, or sequence of images, depending on the required color depth, resolution or complexity of the image (e.g. the amount of depth information within an image).

AV device 20 includes a processor 21 applies suitable processing to the data to render a 3D image. In the case of stereoscopic display, where a user is simultaneously or sequentially presented with separate left and right eye images, processor 21 constructs the separate left eye/right eye images and outputs them 24 at the required time. For sequential stereoscopic displays, a further output 23 is provided to synchronize operation of shuttered glasses. In the case of an autostereoscopic display, such as a display using a ventricular screen, processor 21 constructs the image data which is required to be output 24 to the display elements to generate the autostereoscopic display. Interface part 22 and processor 21 use the signaling information sent across the interface to:

determine if stereoscopic image data is being sent; determine what general stereoscopic image format is being used (e.g. left+right image; 2D+depth; stereo encoded within active image data);

determine more detail of how the image data is being encoded on the interface, and therefore what decoding scheme should be used at the receiver. This may include information about which deep color mode is being used, bit allocation between 2D and depth data, transmission location of depth data (e.g. specific Data Island Packets or auxiliary channel locations).

Further signaling between the AV devices 10, 20 allows the sink device 20 to indicate it's capabilities to receive and process image data. The capability information may indicate the maximum allowed bandwidth for each mode of sending 2D and stereo image data. In HDMI, the capability of a sink device can use the Display Data Channel (DDC) channel, with capability data being stored in an Extended Display Identification Data (EDID) ROM at a sink.

The interface may support other schemes for sending stereoscopic data. A first alternative is to send two separate complete images, carried sequentially (such as a complete left image followed by a complete right image). The indication of the left and right image can be indicated by signaling information carried directly adjacent the position of the image data, such as an HDMI Data Island Packet.

A second alternative is to send two separate images, but with the lines of the two images interleaved. For example, the first line of the left image is sent first, followed by the first line of the right image, and so on.

A third alternative is to send a 2D image in a conventional manner, and to carry depth information in specific Data Island Packets dedicated to carrying depth information.

In each of these alternatives, signaling information carried directly adjacent the position of the image data, such as an HDMI Data Island Packet, can indicate what the image data corresponds to. For the third alternative, the signaling information can specify which part of the image the depth data relates to. As noted above, the HDMI Data Island Packets can be a General Control Packet, an Auxiliary Video InfoFrame (AVI) packet or an InfoFrame Packet specifically designated for this purpose. The information in these packets can identify:

the current stereoscopic method (field, line or byte) being used (see above);

whether a Deep Color Pixel Packing mode is being used to carry 3D information or a Deep Color Mode 2D image;

the mapping of left and right images to the current field, line or byte;

how many of the Data Island Packet packets/sub-packets are being uses to carry Depth information;

the location of other stereoscopic image data components.

The embodiments above show how the separate stereoscopic image components can be carried over a display interface. For some applications, especially those intended for display on a ventricular screen, the picture received at the interface part 12 may already be encoded with stereoscopic content. As an example, a WOWvx encoded image as described in the background section, comprises a 2D image, depth information and/or occlusion information already embedded into separate regions of a conventional image. In one embodiment, the 2D image is carried in one quarter of the image pixels (e.g. in half a line for half the total lines in the picture). The associated depth and/or occlusion information is carried in the other three-quarters of the presented picture. In this case, the lines of the picture are transported across the HDMI link as thought they were a single 2D image occupying all of each line, for all the available lines. In order to identify such a 3D image, an HDMI Data Island Packet (typically a General Control Packet, Auxiliary Video InfoFrame (AVI) packet or specifically designated InfoFrame Packet) indicates this method. The information in this Packet identifies:

the current stereoscopic method (e.g. 2D+Depth) being used;

any information pertaining to this method which is required by the display.

The sink identifies the transmitted picture as using this method and processes the picture accordingly. The sink also carries information in the EDID indicating that it supports this method.

Figure 7:
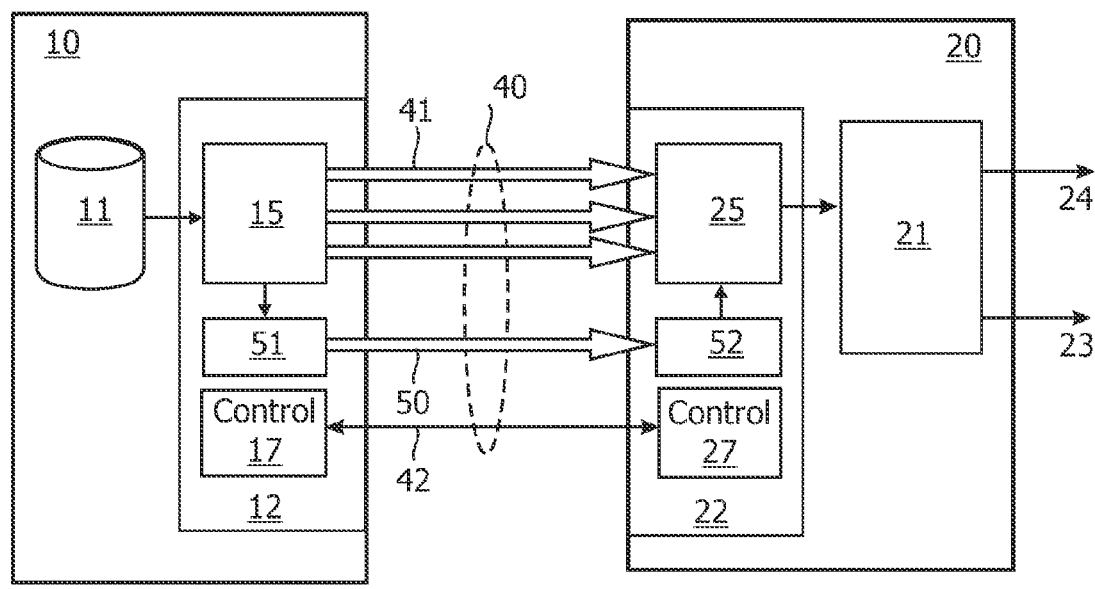
FIG. 7 shows a display interface which includes an auxiliary data channel.

In the above description, stereoscopic image data is carried over a channel of an interface (e.g. an HDMI Transport Stream) either by multiplexing the stereoscopic image data within normal data carrying elements of the channels, or by carrying at least part of the stereoscopic image data within other packets (e.g. Data Island Packets) carried over the same channel. A further embodiment of the invention carries at least some of the stereoscopic image data over an associated high speed auxiliary data link such as Gigabit Ethernet, IEEE 1394 or a high-speed wireless link. Signaling information identifies which information is carried by the primary channels of the interface and which is carried by the associated auxiliary link. In HDMI, the signaling information can be carried in Data Island Packets. Similar, or complementary, identification information may also be carried on the associated high speed auxiliary link. The sink uses the received Data Island Packets to identify which information is carried on which link and combines the two streams of data in the necessary format for presentation or processing. Depending on the characteristics of the HDMI and associated auxiliary link, it may be necessary to buffer the data contained in the two streams in order to maintain synchronicity between them. In one embodiment using the above embodiment, the associated wires for the auxiliary link are carried within the HDMI cable; this option is shown in FIG. 7 by additional line 50 connecting modules 51, 52 in interface parts 12, 22. In other embodiments, the associated auxiliary link is carried in a separate cable connecting the devices 10, 20, or by a high-speed wireless link.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A digital display interface part, for use in a first audio-visual device, for supporting a digital display interface between the first audio-visual device and a second audio-visual device, the digital display interface having a known data carrying capacity for transmitting uncompressed pixel information, the interface part comprising:
   an input for receiving image data;
   a formatter arranged to format the data for transport over the interface, wherein the formatter, in accordance with signal information received from the second audio-device, is operable in:
      a first mode to generate a stream of first data elements, said first data element comprising pixel data of a 2D image, at a data carrying capacity no greater than said known data carrying capacity; and,
      a second mode to generate a stream of second data elements which carry a multiplexed combination of components of a stereoscopic image, wherein said components of said stereoscopic image elements being transmitted in a first portion of said interface and in a second portion of said interface, each of said first portion and said second portion having a lesser data carrying capacity than said known data carrying capacity and a combined data carrying capacity no greater than said known data carrying capacity, wherein the interface part is arranged to send signaling information across the interface, the signaling information identifying which mode the formatter is using and characteristics of said steam of second data elements.

2. The interface part according to claim 1, wherein the signaling information comprises information for enabling the second audio-visual device to determine a stereoscopic image format being used in the second mode.

3. The interface part according to claim 2, wherein the signaling information is carried in one of: a horizontal and a vertical blanking period.

4. The interface part according to claim 1, wherein the interface is a High Definition Multimedia Interface (HDMI) and the signaling information is sent in a Data Island Packet between image data.

5. The interface part according to claim 4, said signaling information received across the interface specifies capabilities of the second audio-visual device.

6. The interface part according to claim 1, wherein the stereoscopic image data components are left eye image data and right eye image data.

7. The interface part according to claim 6, arranged for sending the left eye image data and the right eye image data sequentially.

8. The interface part according to claim 7, wherein an indication of the left and right image data being indicated by signaling information carried directly adjacent a position of the image data.

9. The interface part according to claim 6, arranged for sending the left eye image data and the right eye image data by line interleaving.

10. The interface part according to claim 1, wherein the stereoscopic image data components are 2D image data and image depth data.

11. The interface part according to claim 10, wherein the formatter is arranged to use a portion of the second data element to carry the 2D image data and another portion of the second data element to carry the image depth data.

12. A digital display interface part for use in an audio-visual device, said interface part supporting a digital display interface having a known data carrying capacity between the audio-visual device and a second audio-visual device, and receiving uncompressed pixel information, the interface part comprising:
   an input for receiving formatted image data from the interface;
   a processor arranged to extract said image data, the processor being operable, in accordance with capabilities of said second audio-visual device, wherein
      in a first mode, the processor extracts pixel image data for a 2D image from a stream of first data elements at a data carrying capacity no greater than said known data carrying capability; and,
      in a second mode, the processor demultiplexes components of a stereoscopic image from a stream of second data elements which carry a multiplexed combination of components of a stereoscopic image, wherein said components of said stereoscopic image data elements being transmitted in a first portion of said interface and in a second portion of said interface, each of said first portion and said second portion having a lesser data carrying capacity than said known data carrying capacity and a combined data carrying capacity no greater than said known data carrying capacity, the interface part further arranged to receive signaling information across the interface, the signaling information identifying which of said first mode and said second mode is used and characteristics of said steam of second data elements.

13. The interface part according to claim 12, wherein the signaling information comprises:
   information for enabling the audio-visual device to determine a stereoscopic image format being used, and
   the interface part arranged to determine said stereoscopic image format being used.

14. The interface part according to claim 12, wherein the interface is a High Definition Multimedia Interface (HDMI) and the signaling information is received in a Data Island Packet between image data.

15. The interface part according to claim 12, wherein the stereoscopic image data components are left eye image data and right eye image data.

16. A method of formatting image data at a digital display interface part of a first audio-visual device for transport over a digital display interface between the first audio-visual device and a second audio-visual device, the digital display interface having a known data carrying capacity for transmitting uncompressed pixel information, the method causing a processor in the digital interface part to execute the steps comprising:
   receiving image data;
   formatting the image data for transport over the interface, in accordance with capabilities of the second audio-visual device received in a signaling information, said formatting comprising:
      generating, in a first mode, a stream of first data elements said first data elements comprising pixel data of a 2D image, at a data carrying capacity no greater than said known data carrying capacity; and,
      generating, in a second mode, a stream of second data elements said second data elements comprising a multiplexed combination of components of a stereoscopic image, said components of said stereoscopic image data elements being transmitted in a first portion of said interface and in a second portion of said interface, each of said first portion and said second portion having a lesser data carrying capacity than said known data carrying capacity and a combined data carrying capacity no greater than said known data carrying capacity, wherein characteristics of said steam of second data elements is presented in a second signaling information.

17. The method according to claim 16, wherein the second signaling information comprises information for enabling the second audio-visual device to determine a stereoscopic image format being used.

18. A method of processing image data at a digital display interface part of an audio-visual device, said interface part supporting a digital display interface having a known data carrying capacity for carrying uncompressed pixel information, the method causing a processor in the digital display interface part to execute the steps comprising:
receiving signaling information and formatted image data from the interface;
extracting image data in accordance with capabilities of said audiovisual device, by:
extracting pixel image data for a 2D image from a stream of first data elements at a data carrying capacity no greater than said known data carrying capability in a first mode; and,
demultiplexing components of a stereoscopic image from a stream of second data elements which carry a multiplexed combination of components of a stereoscopic image in a second mode, said components of said stereoscopic image data elements being transmitted in a first portion of said interface and in a second portion of said interface, each of said first portion and said second portion having a lesser data carrying capacity than said known data carrying capacity and a combined data carrying capacity no greater than said known data carrying capacity, wherein characteristics of said steam of second data elements are presented in said signaling information.

\* \* \* \* \*